Figure 3:
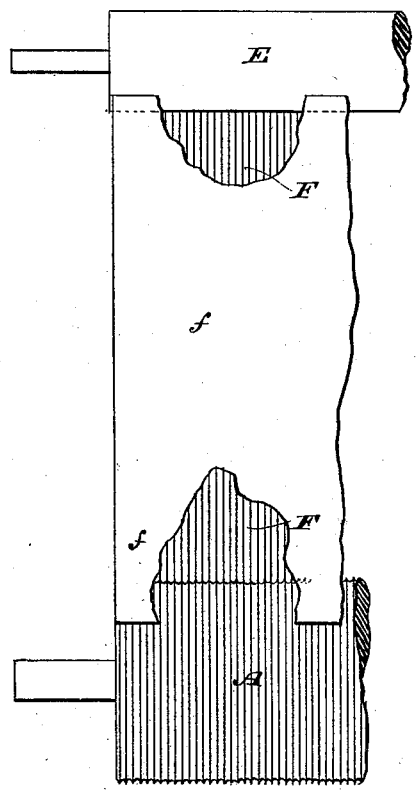

(No Model.)　　　　　　　　　　　　　　　　　　　2 Sheets—Sheet 1.
H. N. POMEROY.
ROLLER MILL.
No. 254,043.　　　　　　　　　　Patented Feb. 21, 1882.
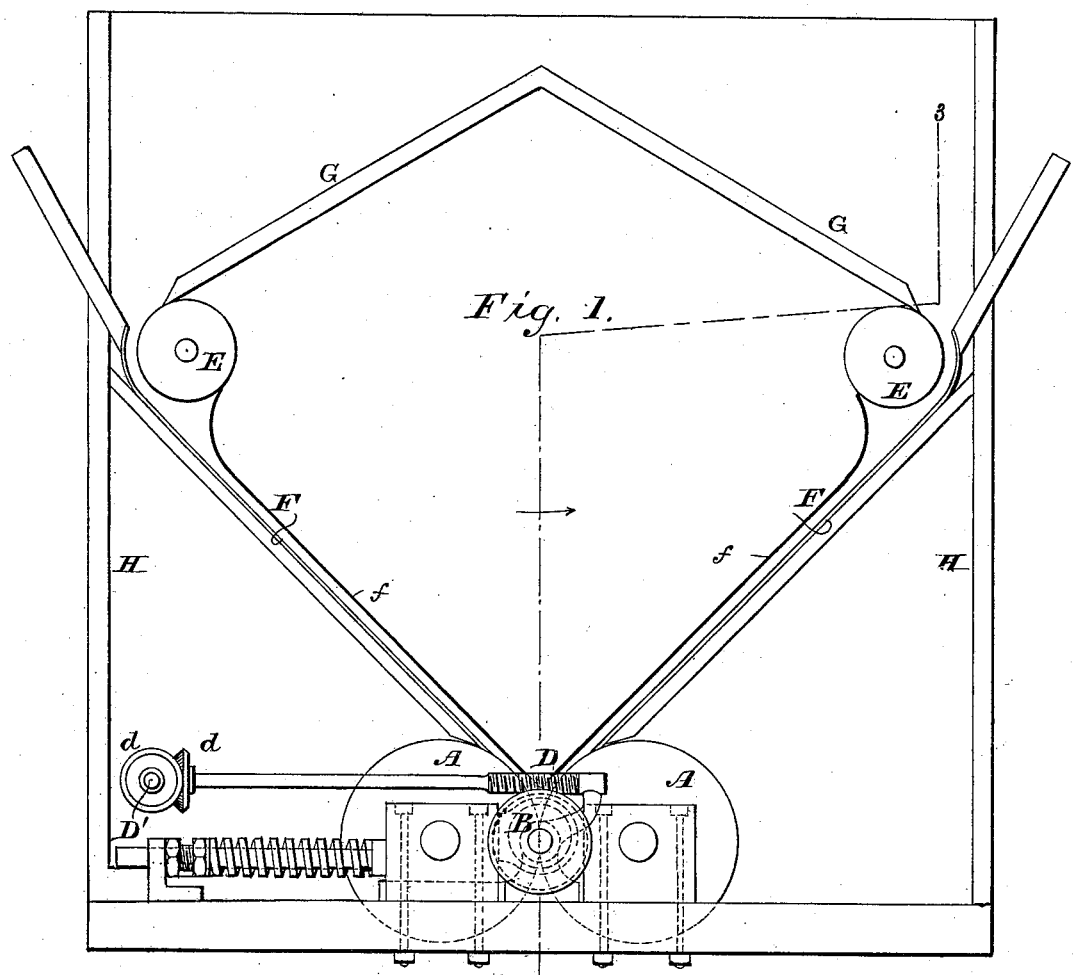
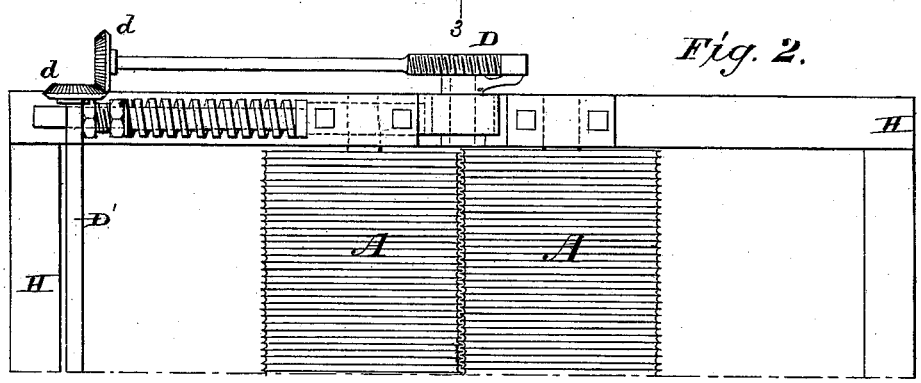
WITNESSES　　　　　　　　　　　　　　　　INVENTOR
H. W. Elmore.　　　　　　　　　　　　　　　Henry N. Pomeroy,
Jos. S. Latimer.　　By his Attorneys
　　　　　　　　　Baldwin, Hopkins, & Peyton.

(No Model.)

H. N. POMEROY.
ROLLER MILL.

No. 254,043. Patented Feb. 21, 1882.

2 Sheets—Sheet 2.

WITNESSES
Wm A. Skinkle
Jos¹. S. Latimer

INVENTOR
Henry N. Pomeroy.
By his Attorneys
Baldwin, Hopkins, & Peyton.

UNITED STATES PATENT OFFICE.

HENRY N. POMEROY, OF MADISON, WISCONSIN, ASSIGNOR OF ONE-THIRD TO CHARLES E. BALL, OF SAME PLACE.

ROLLER-MILL.

SPECIFICATION forming part of Letters Patent No. 254,043, dated February 21, 1882.

Application filed June 25, 1881. (No model.)

*To all whom it may concern:*

Be it known that I, HENRY N. POMEROY, of Madison, in the State of Wisconsin, have invented certain new and useful Improvements in Roller-Mills for the Manufacture of Flour from Wheat, of which the following is a specification, reference being had to the accompanying drawings.

The object of my invention is to split each kernel of grain in the line of the crease or natural groove of the berry as the first step in the reduction preparatory to subsequent operations for producing superior flour. I do this for the purpose of freeing or detaching, as nearly as possible, the germ and crease-dirt, and producing coarse middlings of even granulation, with the least possible irregular breaking of the kernels and production of flour, so that afterward the germ and crease-dirt can be separated from the divided grains with the least possible waste or intermingling of flour.

In the accompanying drawings, illustrating my invention, Figure 1 shows an end elevation of my improved mill; Fig. 2, a half-plan of the same. Fig. 3 is a vertical elevation, partly broken away, on the lines 3 of Fig. 1.

In these figures, A A indicate the rolls, which have corresponding circumferential V-shaped grooves of suitable size to receive kernels of wheat arranged in line with them. The dividing-partitions of these grooves are sharp-edged, and they project centrally into the grooves of the roll opposite, so as to centrally and longitudinally split each kernel of grain. The rolls are made adjustable by mechanism such as shown for simultaneously and equally moving both ends of one of them, or by any other suitable adjusting mechanism.

The mechanism shown consists of eccentrics B, placed between the journal-boxes of the roll-shafts, operated by a screw, D, at each end of the rolls, and connected by bevel-gears $d\ d$ and a shaft $D'$, one of the sets of boxes being arranged to slide upon their supports in any ordinary way.

The feeding apparatus consists of two rolls, E E, located at a proper distance above the splitting-rolls, and connected with them by inclined corrugated aprons F F, so adjusted with respect to the feed-rolls as to deliver the kernels along their corrugations or troughs into the grooves of the splitting-rolls.

Above the feed-rolls are two inclined aprons, G G, which convey the grain in opposite directions to the feed-rolls.

The working parts above described are inclosed within a suitable casing, H, which serves to confine the grain and as a support for the feeding apparatus.

The guides or aprons F F are provided with a cover, $f$, which serves to confine the grain in its passage from the feed-rolls to the splitting-rolls.

The operation is as follows: The grain is supplied upon the upper surfaces of the aprons G G and falls upon the rolls E E, which should be driven in opposite directions at equal speeds—that is, each in a direction to feed the grain downward onto the corrugated aprons F F. The troughs in these aprons are of a size corresponding to the grooves in the splitting-rolls, and are in line with them, and these troughs serve to arrange the kernels endwise, so that they descend and enter the grooves in the splitting-rolls in that position, and are there merely divided longitudinally with great regularity without crushing them into flour, and the half-grains are then delivered below into any suitable receptacle or apparatus for further treatment.

I do not confine myself to the details of mechanism above described, as the principle of my invention consists in delivering kernels of grain end foremost to longitudinally-dividing mechanism, which severs them, as described, and it may be embodied and practiced with some mechanical modification of the devices I have illustrated and explained. For example, the grooves in the rolls need not necessarily be V-shaped; but notwithstanding this, my invention does not broadly cover the idea of cutting kernels of grain without grinding them, and I am aware of German Patent No. 4,545 of 1878, in which rollers with circumferential cutting-blades opposite each other are shown for the purpose of cutting kernels of grain into pieces without grinding them.

What I claim as of my invention, and desire to secure by Letters Patent, is—

1. The combination of two grooved grain-splitting rolls having intervening sharp edged projections or cutting-edges passing or overlapping each other and not opposite each other, the rolls being adapted to be revolved at a uniform speed for splitting kernels of wheat or like grain longitudinally without grinding them, substantially as described.

2. The combination of the corrugated grain-delivery apron F and the grooved rolls, constructed and operating substantially as set forth.

3. The combination of the apron G, the feed-roll E, the inclined corrugated apron F, and the grooved rolls A A, substantially as set forth.

In testimony whereof I have hereunto subscribed my name this 13th day of June, A. D. 1881.

HENRY N. POMEROY.

Witnesses:
R. M. LaFollette,
H. H. Rand.